United States Patent
Wu et al.

(10) Patent No.: US 8,688,126 B2
(45) Date of Patent: Apr. 1, 2014

(54) METHOD FOR FALLING BACK TO 2G/3G NETWORK, RELEVANT DEVICE AND COMMUNICATION SYSTEM

(75) Inventors: Xiaobo Wu, Shanghai (CN); Hai Liu, Shanghai (CN)

(73) Assignee: Huawei Technologies Co. Ltd., Shenzhen (CN)

( * ) Notice: Subject to any disclaimer, the term of this patent is extended or adjusted under 35 U.S.C. 154(b) by 48 days.

(21) Appl. No.: 13/572,594

(22) Filed: Aug. 10, 2012

(65) Prior Publication Data

US 2012/0309399 A1 Dec. 6, 2012

Related U.S. Application Data (63) Continuation of application No. PCT/CN2011/070911, filed on Feb. 10, 2011.

(30) Foreign Application Priority Data

Feb. 11, 2010 (CN) .......................... 2010 1 0111579

(51) Int. Cl.
*H04W 36/00* (2009.01)

(52) U.S. Cl.
USPC ........................................................ 455/437

(58) Field of Classification Search
USPC ........ 455/435.1, 435.2, 435.3, 436, 437, 438, 455/439, 440, 441, 442, 443, 444, 445; 370/328, 329, 330, 331, 332, 333, 334, 370/335, 336, 337, 338, 401, 310
See application file for complete search history.

(56) References Cited

U.S. PATENT DOCUMENTS

2006/0258358 A1* 11/2006 Kallio ........................... 455/437
2009/0247165 A1* 10/2009 Chen et al. .................... 455/436
(Continued)

FOREIGN PATENT DOCUMENTS

CN 101374258 A 2/2009
WO WO 2009/000696 A1 12/2008
(Continued)

OTHER PUBLICATIONS

3$^{rd}$ Generation Partnership Project; Technical Specification Group Services and System Aspects; Circuit Switched Fallback in Evolved Packet Systems; Stage 2 (Release 9), 3GPP TS 23.272 V9.2.0, Dec. 2009, 64 pages.

(Continued)

*Primary Examiner* — Kiet Doan
(74) *Attorney, Agent, or Firm* — Slater & Matsil, L.L.P.

(57) ABSTRACT

Embodiments of the present invention provides a method for falling back to a 2G/3G network, a relevant device and a system. The embodiments of the present invention includes: receiving, by a mobility management entity, a first message from an access network device, where the first message carries location area information of a target 2G/3G cell to which a user equipment UE prepares to connect; sending a second message for requesting to perform a location update on the UE to a mobile switching center MSC corresponding to a location area of the target 2G/3G cell; receiving a third message from the MSC, where the third message carries a temporary mobile station identity TMSI allocated to the UE by the MSC; and sending, to the UE, a fourth message carrying the TMSI, so that the UE, after being connected to the target 2G/3G cell, communicates with the MSC by using the TMSI.

8 Claims, 7 Drawing Sheets

(56) References Cited

U.S. PATENT DOCUMENTS

| | | | |
|---|---|---|---|
| 2010/0113010 A1* | 5/2010 | Tenny et al. | 455/423 |
| 2010/0265884 A1* | 10/2010 | Vikberg et al. | 370/328 |
| 2010/0303041 A1 | 12/2010 | Diachina et al. | |
| 2010/0331011 A1* | 12/2010 | Vikberg et al. | 455/456.1 |
| 2012/0046037 A1 | 2/2012 | Diachina et al. | |

FOREIGN PATENT DOCUMENTS

| | | | | |
|---|---|---|---|---|
| WO | WO 2009/081268 A1 | 7/2009 | | |
| WO | WO2009081268 | * 7/2009 | | H04W 8/02 |
| WO | WO 2009/095777 A1 | 8/2009 | | |
| WO | WO2009095777 | * 8/2009 | | H04W 76/02 |

OTHER PUBLICATIONS

First Office Action of Chinese Application No. 201010111579.0 mailed Jan. 21, 2013, 13 pages. (Partial Translation).

International Search Report received in International Application No. PCT/CN2011/070911, Applicant: Huawei Technologies Co., Ltd., et al., mailed May 12, 2011, 3 pages.

Written Opinion of the International Searching Authority received in International Application No. PCT/CN2011/070911, Applicant: Huawei Technologies Co., Ltd., et al., mailed May 12, 2011, 6 pages.

* cited by examiner

METHOD FOR FALLING BACK TO 2G/3G NETWORK, RELEVANT DEVICE AND COMMUNICATION SYSTEM

CROSS-REFERENCE TO RELATED APPLICATIONS

This application is a continuation of International Application No. PCT/CN2011/070911, filed Feb. 10, 2011, which claims priority to Chinese Patent Application No. 201010111579.0, filed Feb. 11, 2010, both of which applications are incorporated herein by reference.

TECHNICAL FIELD

The present invention relates to the field of communications technologies, and specifically to a method for falling back to a 2G/3G network, a relevant device and a communication system.

BACKGROUND

Currently, the second generation global mobile communications technology/third generation global mobile communications technology (2G/3G, $2^{nd}$ Generation/$3^{rd}$ Generation) network has been widely deployed in many regions, which can be regarded as an overall coverage to a certain degree.

Based on a need of communication development, a standardization organization of the third generation partnership project has launched architecture of a new generation evolved network, where a core network part is a system architecture evolution (SAE) network, an access network part is an evolved universal mobile telecommunications system terrestrial radio access network (E-UTRAN) of a long term evolution (LTE) network. The new generation evolved network has covered some urban areas and traffic hot spot regions.

For ease of description, a network that only provides the SAE/LTE in a PS domain is referred to as a pure PS domain network. For different network bearer mechanisms, mobile communication services may be divided into circuit switching (CS) domain bearer services, such as a voice call, a short message, and a supplementary service, and so on; and packet switching (PS) domain bearer services, including a data service and a session service, where the session service includes a voice over Internet Protocol (VoIP) service.

In a practical application, the voice service may be borne in the CS domain and can also be borne in the PS domain. Based on different network coverage scenarios, during a communication procedure of a user, a problem of needing a fallback from an LTE network to a 2G/3G network might often occur. In the prior art, after a user equipment (UE) is connected to the 2G/3G network, if it finds that a location area is changed, the UE initiates a location update process (which usually takes a few seconds) and can only initiate a voice call or receive a call after location update is completed, which greatly affects user experience.

SUMMARY OF THE INVENTION

Embodiments of the present invention provide a method for falling back to a 2G/3G network, a relevant device and a communication system, which help to keep voice continuity during a procedure that a UE is connected to a 2G/3G network.

In one aspect, the present invention provides a method for initiating a fallback to a 2G/3G network, including: receiving, by an access network device, an instruction that a user equipment UE requires a fallback to the 2G/3G network and information of a location area where the UE is currently registered which are sent by a mobility management entity MME; and sending, by the access network device, according to the information of the location area where the UE is currently registered, the MME a message carrying location area information of a target 2G/3G cell.

In another aspect, the present invention provides an access network device, including: a receiving unit, configured to receive an instruction that a user equipment UE requires a fallback to a 2G/3G network and information of a location area where the UE is currently registered which are sent by a mobility management entity MME; and a sending unit, configured to send, according to the information of the location area where the UE is currently registered, the MME a message carrying location area information of a target 2G/3G cell.

In still another aspect, the present invention provides a method for falling back to a 2G/3G network, including: receiving, by a mobility management entity, a first message from an access network device, where the first message carries location area information of a target 2G/3G cell to which a user equipment UE prepares to connect; sending a second message for requesting to perform a location update on the UE to a mobile switching center MSC corresponding to a location area of the target 2G/3G cell; receiving a third message from the MSC, where the third message carries a temporary mobile station identity TMSI which is allocated to the UE by the MSC; and sending, to the UE, a fourth message carrying the TMSI, so that after being connected to the target 2G/3G cell, the UE communicates with the MSC by using the TMSI.

In still another aspect, the present invention further provides a method for falling back to a 2G/3G network, including: sending, by an access network device, a first message to a mobility management entity, where the first message carries location area information of a target 2G/3G cell to which a user equipment UE prepares to connect; and triggering, after determining that the UE has obtained, from the mobility management entity, a temporary mobile station identity TMSI allocated to the UE by an MSC corresponding to a location area of the target 2G/3G cell, that the UE is be connected to the target 2G/3G cell.

In still another aspect, the present invention further provides a mobility management entity, including: a first receiving module, configured to receive a first message from an access network device, where the first message carries location area information of a target 2G/3G cell to which a user equipment UE prepares to connect; a first sending module, configured to send, to a mobile switching center MSC corresponding to a location area of the target 2G/3G cell, a second message for requesting to perform a location update on the UE; a second receiving module, configured to receive a third message from the MSC, where the third message carries a temporary mobile station identity TMSI allocated to the UE by the MSC and a location area identity LAI; and a second sending module, configured to send, to the UE, a fourth message carrying the TMSI and the LAI, so that after being connected to the target 2G/3G cell, the UE communicates with the MSC by using the TMSI.

In still another aspect, the present invention further provides an access network device, including: a third sending module, configured to send a first message to a mobility management entity, where the first message carries location area information of a target 2G/3G cell to which a user equipment UE prepares to connect; a trigger module, configured to trigger, after determining that the UE has obtained, from the mobility management entity, a temporary mobile station identity TMSI allocated to the UE by an MSC corresponding to a location area of the target 2G/3G cell, that the UE is connected to the target 2G/3G cell.

In still another aspect, the present invention further provides a communication system, including: apparatuses described in the foregoing embodiments.

It may be seen from the foregoing, before the access network device in the embodiments of the present invention triggers that the UE is connected to the target 2G/3G cell, the location area information of the target 2G/3G cell to which the UE prepares to connect is first notified to the MME, the MME requests the MSC corresponding to the location area of the target 2G/3G cell to perform the location area update on the UE, and feeds back the TMSI allocated to the UE by the MSC to the UE, so that after being connected to the target 2G/3G cell subsequently, the UE may directly use the TMSI to communicate with the MSC and perform a corresponding service, and no longer need to obtain the TMSI by initiating a location area update process after being connected to the target 2G/3G cell, which may reduce a delay of a UE voice service. It may be found that the solutions according to the embodiments of the present invention help to reduce the delay of the voice service when the UE falls back to the 2G/3G network.

BRIEF DESCRIPTION OF THE DRAWINGS

To illustrate the technical solutions in the embodiments of the present invention more clearly, accompanying drawings for describing the embodiments are introduced briefly in the following. Obviously, the accompanying drawings in the following description are only some embodiments of the present invention, and persons of ordinary skill in the art may obtain other drawings from the accompanying drawings without making creative efforts.

FIG. 6-*a* is a schematic diagram of a mobility management entity according to an embodiment of the present invention;

FIG. 6-*b* is a schematic diagram of another mobility management entity according to an embodiment of the present invention;

FIG. 7-*a* is a schematic diagram of an access network device according to an embodiment of the present invention;

FIG. 7-*b* is a schematic diagram of another access network device according to an embodiment of the present invention;

DETAILED DESCRIPTION OF ILLUSTRATIVE EMBODIMENTS

Embodiments of the present invention provide a method for falling back to a 2G/3G network, a relevant device and a communication system, which help to reduce a delay of a voice service in a procedure a UE falls back to the 2G/3G network.

In order to make the invention objectives, features, and advantages of the present invention more obvious and comprehensible, the technical solutions of the present invention are clearly and completely described in the following with reference to the accompanying drawings in the embodiments of the present invention. Obviously, the embodiments described are only part of rather than all of the embodiments of the present invention. All other embodiments obtained by persons of ordinary skill in the art based on the embodiments of the present invention based on the embodiments of the present invention without making creative efforts shall fall within the protection scope of the present invention.

Figure 1:
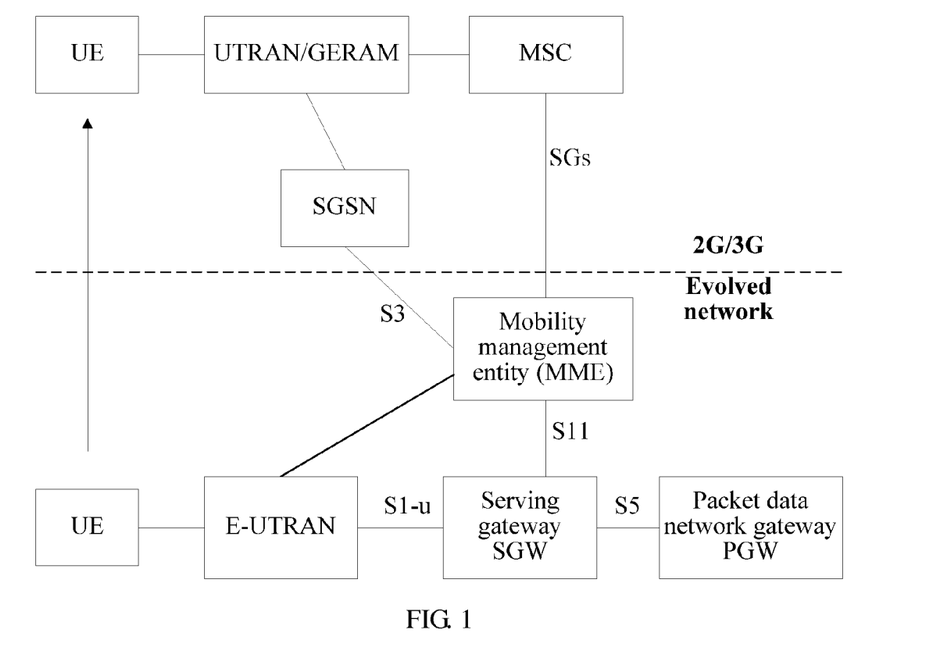
FIG. 1 is a schematic architecture diagram of reselection from an LTE network to a 2G/3G network according to an embodiment of the present invention.

For ease of understanding by persons skilled in the art, a schematic diagram of a network layout shown in FIG. 1 is provided first, where an E-UTRAN is mainly formed of evolved base stations (eNB, Evolution-NodeB). A core network part of an evolved network includes a mobility management entity (MME) and an SAE gateway. The SAE gateway includes a serving gateway (SGW) and a packet data network gateway (PGW, PDN Gateway).

The MME is a control plane node of the core network part in an evolved network system and bears a management function of a user equipment (UE) context and user plane bearer; the SGW mainly bears a transmission function of service data, and the PGW mainly bears a transmission function of signaling. An UTRAN/GERAM is an access network of the 2G/3G network, a mobile switching center (MSC) is mainly responsible for bearer control of the voice service, and an SGSN is mainly responsible for bearer control of data service.

An SGs interface is introduced between the MME and the MSC. For ease of description, both an MSC and an MSC server are referred to as the MSC.

A circuit switching fallback (CSFB) is a technology of reselecting a UE from an LTE network to a 2G/3G network, the solutions in the embodiments of the present invention mainly aims at a problem of how to reduce a call setup delay in a CSFB solution of reselecting the UE to the 2G/3G network by using a network assisted cell change (NACC) method or a PS handover method if a location area of a target 2G/3G cell and a location area where the UE is currently registered are inconsistent (that is, a case in which the location area of the UE is going to change, and in this case, the MSC allocates a new TMSI to the UE, and the UE needs to communicate with the MSC by using the new TMSI, so as to perform a corresponding service). Specific embodiments are used for detailed description in the following.

Of course, the technical solutions in the embodiments of the present invention are also applicable to a process that a UE falls back from a high-speed packet access (HSPA) network to a 2G/3G network. A corresponding access network device is a radio network controller (RNC), and a corresponding mobility management entity is a serving general packet radio service (GPRS) support node (SGSN, Serving GPRS Support Node).

Figure 2:
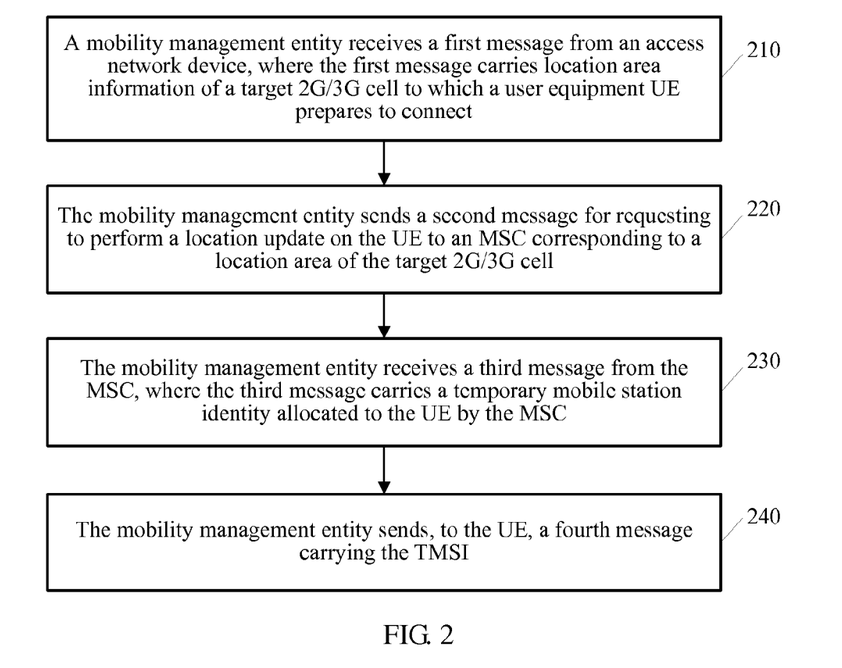
FIG. 2 is a flow chart of a method for falling back to a 2G/3G network according to an embodiment of the present invention.

A method for falling back to a 2G/3G network according to an embodiment of the present invention is first described from the angle of a mobility management entity. Referring to FIG. 2, the method for falling back to the 2G/3G network according to this embodiment of the present invention may include:

210: A mobility management entity receives a first message from an access network device, where the first message carries location area information of a target 2G/3G cell to which a user equipment UE prepares to connect.

The mobility management entity in this embodiment may be, for example, an MME or an SGSN, or other core network devices having an equivalent or similar function. The access network device may be, for example, an evolved base station (eNB, Evolution-NodeB) or an RNC in an E-UTRAN, or other access network devices having an equivalent or similar function. An example that the mobility management entity is an MME and the access network device is an ENB is taken for illustration in the following.

The first message may be, for example, a newly added message for notifying the MME of the location area information of the target 2G/3G cell to which the UE (a calling UE or a called UE) prepares to connect. Alternatively, an existing handover request message (handover required) may also be used, where the message already carries the location area information of the target 2G/3G cell. Further, one field may be added in the handover request message for instructing whether a handover needs to be initiated, and if the field instructs that the handover is not needed, the MME does not initiate a PS handover process to a 2G/3G. Of course, it may be judged by the MME whether a PS handover needs to be initiated. For example, if the target 2G/3G network does not support the PS handover, the MME does not initiate the PS handover.

220. The mobility management entity sends a second message for requesting to perform a location update on the UE to an MSC corresponding to a location area of the target 2G/3G cell.

In one application scenario, the second message may be, for example, a location update request message, or other messages that may request the MSC to perform the location update on the UE.

The MME needs to determine, before sending a second message to the MSC, whether a location area of the UE is going to change. One determining method may be comparing whether the location area of the target 2G/3G cell is the same as the location area where the UE is currently registered, and if different, determining that the location area of the UE is going to change; and if the same, determining that the location area of the UE is not going to change.

Alternatively, it may also be determined by the access network device whether the location area of the UE is going to change, and if going to change, the access network device sends the first message to the MME. The MME may directly determine, upon receiving the first message from the access network device, that the location area of the UE is changed. In this case, the access network device needs to learn information of the location area where the UE is currently registered, and determines, according to the information of the location area where the UE is currently registered, whether the location area of the UE is going to change. The learning method may be: sending, by the MME, after receiving an extended service request message sent by the UE, the access network device a message carrying the information of the location area where the UE is currently registered, and the access network device then learns the information of the location area where the UE is currently registered.

The MME sends, if determining that the location area of the UE is going to change, a second message to the MSC.

Further, the MSC may receive the second message for requesting to perform the location update on the UE from the MME, and may allocate a new temporary mobile station identity TMSI to the UE, and may also allocate a location area identity LAI to it.

230. The mobility management entity receives a third message from the MSC, where the third message carries information of the temporary mobile station identity (TMSI) allocated to the UE by the MSC.

In one application scenario, the third message may be, for example, a location update response message, or other messages carrying the TMSI allocated to the UE by the MSC, and further, the message may also carry the location area identity (LAI) allocated to the UE by the MSC.

240. The mobility management entity sends, to the UE, a fourth message carrying the TMSI and the LAI, so that after being connected to the target 2G/3G cell, the UE communicates with the MSC by using the TMSI.

Further, the third message may also carry the LAI allocated to the UE by the MSC, so that the UE stores the LAI, and after being connected to the target 2G/3G cell, when finding by comparison that the LAI stored by it is the same as a LAI corresponding to the target 2G/3G cell, does not initiate a location area update process. It may be understood that the LAI stored by the UE is the same as the LAI corresponding to the target 2G/3G cell.

Further, the UE may update a currently registered LAI by using the LAI obtained from the MME; the access network device (ENB) may trigger, after determining that the UE has obtained, from the MME, the temporary mobile station identity TMSI and the location area identity LAI which are allocated to the UE by the MSC corresponding to the location area of the target 2G/3G cell, that the UE is connected to the target 2G/3G cell in a NACC manner or a PS handover manner. After being connected to the target 2G/3G cell, the UE finds the location area stored by it is the same as a current location area of the 2G/3G cell, and therefore does not initiate the location area update procedure, and may directly use the TMSI allocated to it by the MSC to communicate with the MSC and perform a corresponding service, which may reduce a delay of a voice service.

In addition, an access network device may also directly notify the UE of the LAI corresponding to the target cell, the MSC mainly allocates the TMSI to the UE, and the MME may send, after receiving a message carrying the TMSI allocated to the UE by the MSC, the UE a message carrying the TMSI, and notify the UE of the TMSI allocated to the UE by the MSC.

It may be seen from the foregoing, in this embodiment, before the access network device triggers that the UE is connected to the target 2G/3G cell, the location area information of the target 2G/3G cell to which the UE prepares to connect is first notified to the MME, the MME requests an MSC corresponding to the location area of the target 2G/3G cell to perform the location area update on the UE, feeds back to the UE the TMSI allocated to the UE by the MSC, so that after being connected to the target 2G/3G cell subsequently, the UE may directly use the TMSI to communicate with the MSC and perform corresponding services, and no longer needs to obtain the TMSI by initiating the location area update process after being connected to the target 2G/3G cell, which may reduce the delay of the voice service.

Further, after receiving the location update request sent by the MME, the MSC may return a location update reply message to the MME as soon as possible, and then interacts with an HLR or other network elements, so as to further reduce the delay. It may be found that, the solution in this embodiment helps to reduce a voice delay for the UE.

Figure 3:
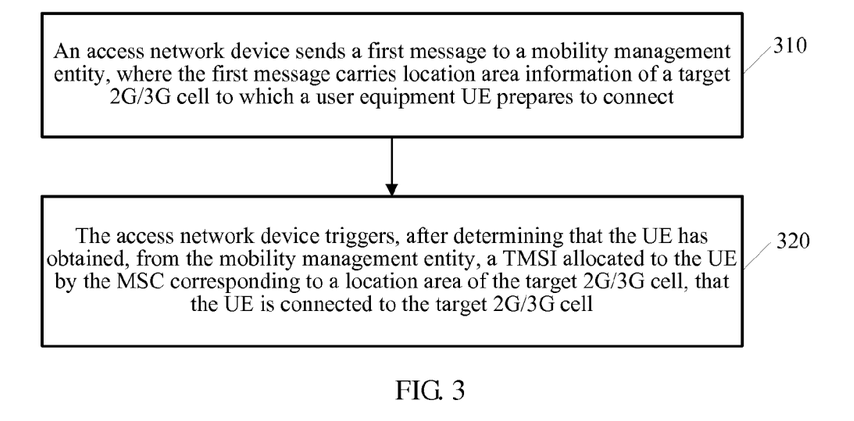
FIG. 3 is a flow chart of another method for falling back to a 2G/3G network according to an embodiment of the present invention.

Further, a method for falling back to a 2G/3G network according to an embodiment of the present invention is described in the following from the angle of an access network device. Referring to FIG. 3, the method for falling back to the 2G/3G network according to another embodiment of the present invention may include:

310. An access network device sends a first message to a mobility management entity, where the first message carries location area information of a target 2G/3G cell to which a user equipment UE prepares to connect.

The mobility management entity in this embodiment may be, for example, an MME or an SGSN, or other core network devices having an equivalent or similar function, and the access network device may be, for example, an evolved base station (eNB, Evolution-NodeB) or an RNC in an E-UTRAN, or other access network devices having an equivalent or similar function. That the mobility management entity is an MME and the access network device is an ENB is taken as an example for illustration in the following.

The first message may be, for example, one newly added message for notifying the MME of the location area information of the target 2G/3G cell to which the UE (a calling UE or a called UE) prepares to connect. Alternatively, an existing handover request message (handover required) may also be used, where the message already carries the location area information of the target 2G/3G cell. Further, one field may be added in the handover request message for instructing whether the handover needs to be initiated, and if this field instructs that the handover is not needed, the MME does not initiate a PS handover process to a 2G/3G. Of course, it may also be judged by the MME whether to initiate a PS handover. For example, if a target 2G/3G system does not support the PS handover, the MME does not initiate the PS handover.

Further, before sending the first message to the MME, the access network device may first determine whether a location area of the UE is going to change, and one determining method may be comparing whether a location area of the target 2G/3G cell is the same as a location area where the UE is currently registered, if different, determines that the location area of the UE is going to change; and if the same, determines that the location area of the UE is not going to change.

In this case, the access network device needs to learn information of the location area where the UE is currently registered, and determines, according to the information of the location area where the UE is currently registered, whether the location area of the UE is going to change. A learning method may be: sending, by the MME, after receiving an extended service request message (extended service request) sent by the UE, the access network device a message carrying the information of the location area where the UE is currently registered, then the access network device further learns the information of the location area where the UE is currently registered.

The access network device sends, if determining that the location area of the UE is going to change, the first message to the MME.

Further, the access network device may also send, to the UE, a message carrying a location area identity LAI information of the target 2G/3G cell, and notify the UE of the LAI information of the target 2G/3G cell, so that the UE stores the LAI, and after being connected to the target 2G/3G cell, when finding by comparison that the LAI stored by it is the same as a LAI corresponding to the target 2G/3G cell, does not initiate a location area update process. It may be understood that, the LAI stored by the UE is the same as the LAI corresponding to the target 2G/3G cell.

In another application scenario, the access network device may also directly send the first message to the MME and the MME determines whether the location area of the UE is going to change.

320. The access network device triggers, after determining that the UE has obtained, from the mobility management entity, a TMSI allocated to the UE by an MSC corresponding to the location area of the target 2G/3G cell, that the UE is connected to the target 2G/3G cell.

Further, the UE may also obtain, from the mobility management entity, the LAI allocated to the UE by the MSC.

In one application scenario, a manner in which the access network device determines whether the UE has obtained, from the MME, the TMSI (and the LAI) allocated to the UE by the MSC corresponding to the location area of the target 2G/3G cell may be.

The MME may notify the access network device (the MSC corresponding to the location area of the target 2G/3G cell) through a new S1-AP message that allocation of the TMSI (and the LAI) to the UE is already completed; or, the MME may add, in a downlink non-access stratum transport (DOWNLINK NAS TRANSPORT) message, one instruction that the allocation of the TMSI (and the LAI) to the UE is already completed; the access network device determines, according to the instruction, that the UE has obtained, from the MME, the TMSI (and the LAI) allocated to the UE by the MSC corresponding to the location area of the target 2G/3G cell; or, the access network device takes by default, upon receiving the DOWNLINK NAS TRANSPORT message, that the allocation of the TMSI (and the LAI) to the UE by the MSC corresponding to the location area of the target 2G/3G cell is already completed.

Of course, the access network device may also determine in other manners that the UE has obtained, from the MME, the TMSI (and the LAI) allocated to the UE by the MSC corresponding to the location area of the target 2G/3G cell.

Further, the UE may update a currently registered LAI by using the LAI obtained from the MME; the access network device (ENB) may trigger, after determining that the UE has obtained, from the MME, the temporary mobile station identity TMSI and the location area identity LAI which are allocated to the UE by the MSC corresponding to the location area of the target 2G/3G cell, that the UE is connected to the target 2G/3G cell in a NACC manner or a PS handover manner. After being connected to the target 2G/3G cell, when finding that the location area stored by it is the same as a current location area of the 2G/3G cell, the UE does not initiate the location area update process and may directly use the TMSI allocated to it by the MSC to communicate with the MSC and perform a corresponding service, which may therefore avoid a voice service interruption of the UE.

In addition, the access network device may also directly notify the UE of the LAI corresponding to the target cell, the MSC mainly allocates the TMSI to the UE, and upon receiving a message carrying the TMSI allocated to the UE by the MSC, the MME sends, to the UE, a message carrying the TMSI to notify the UE of the TMSI allocated to the UE by the MSC.

It may be seen from the foregoing, in this embodiment, before the access network device triggers that the UE is connected to the target 2G/3G cell, the location area information of the target 2G/3G cell to which the UE prepares to connect is first notified to the MME, and the MME requests the MSC corresponding to the location area of the target 2G/3G cell to perform a location area update on the UE, and feeds back to the UE the TMSI allocated to the UE by the MSC, so that after being connected to the target 2G/3G cell subsequently, the UE may directly use the TMSI to communicate with the MSC and perform the corresponding service, and no longer needs to obtain the TMSI by initiating the location area update process after being connected to the target 2G/3G cell, which may reduce a delay of a voice service.

Figure 4:
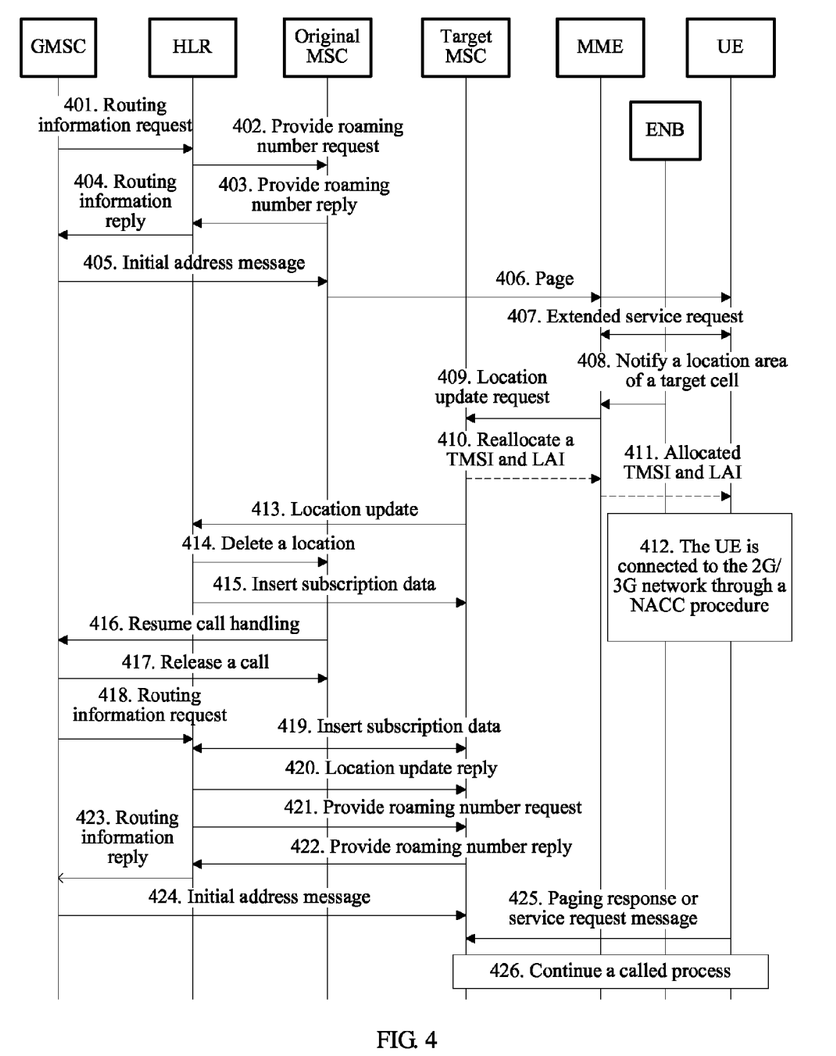
FIG. 4 is a flow chart of another method for falling back to a 2G/3G network according to an embodiment of the present invention.

For better understanding of the solutions in the embodiments of the present invention, a method for falling back to a 2G/3G network according to an embodiment of the present invention is illustrated in the following by taking a procedure that a called UE is connected to the 2G/3G network as an example. Referring to FIG. 4, the method for falling back to the 2G/3G network according to another embodiment of the present invention may include:

401. A gateway mobile switching center sends a Send Routing Information (SRI) request message to a home location register (HLR)

402. The HLR sends a provide roaming number (PRN) request message to a registered MSC (original MSC) of a called UE.

403. The registered MSC of the called UE returns a reply message and provides a roaming number.

404. The HLR responds a send routing information request reply.

405. The gateway mobile switching center (GMSC, Gateway MSC) sends an initial address message (IAM) to the MSC of the called UE.

406. The original MSC starts to page the called UE.

407. The called UE sends an extended service request message to an MME to initiate a CSFB process.

408. An ENB sends, to the MME, a message carrying location area information of a target 2G/3G cell.

The MME may send a context setup message to the ENB to instruct the ENB that the called UE requires initiating the CSFB process. At this time, the ENB may send, after learning that the called UE requires initiating the CSFB process, the MME the message carrying the location area information of the target 2G/3G cell.

Optionally, before the ENB sends a target cell location area notification message to the MME, the ENB may command the called UE to perform measurement; the called UE may report a measurement report, which includes measurement information; and the ENB selects the target 2G/3G cell according to the measurement information.

Of course, the ENB may also select the target 2G/3G cell for the UE according to other conditions.

Further, if the MME notifies the ENB of information of a location area where the UE is currently registered (for example, through the context setup message or other messages), the ENB may first determine whether the location area of the UE is going to change, and if determining that the location area of the UE is going to change, send, to the MME, the message carrying the location area information of the target 2G/3G cell, and if determining that the location area of the UE is not going to change, not send, to the MME, the message carrying the location area information of the target 2G/3G cell.

The message carrying the location area information of the target 2G/3G cell sent to the MME by the ENB may be, for example, a newly added message.

409. The MME sends a message for requesting to perform a location update on the UE to an MSC corresponding to a location area of the target 2G/3G cell (target MSC).

The target MSC and the original MSC might be the same MSC, and might also be different MSCs.

In one application scenario, the message for requesting to perform the location update on the UE sent to the target MSC by the MME may be, for example, a location update request message, or other messages that may request the MSC to perform the location update on the UE.

Before sending a second message to the MSC, the MME needs to determine whether the location area of the UE is going to change, for example, the MME may compare the location area of the target 2G/3G cell and the location area where the UE is currently registered to check whether they are the same, if different, determines that the location area of the UE is going to change; and if the same, determines that the location area of the UE is not going to change.

Alternatively, if it is determined by the access network device whether the location area of the UE is going to change, and after it is determined that a location of the UE is changed, the message carrying the location area information of the target 2G/3G cell is further sent to the MME, so that the MME determines by default, upon receiving the first message from the access network device, that the location area of the UE is changed.

If determining that the location area of the UE is going to change, the MME further sends a location area update request message to the MSC; and if determining that the location area of the UE is not going to change, it may not be executed.

410. The target MSC allocates a new TMSI and LAI to the UE, and sends, to the MME, a message carrying the new TMSI and LAI which are allocated to the UE by the target MSC.

In one application scenario, if the message for requesting to perform the location update on the UE sent to the target MSC by the MME is a location update request message, the message carrying the new TMSI and LAI which are allocated to the UE by the target MSC, where the message is sent to the MME by the target MSC, may be, for example, a location update response message.

411. The MME sends, to the UE, the message carrying the new TMSI and LAI which are allocated to the UE by the target MSC.

The MME may, for example, carry information such as the new TMSI and LAI which are allocated to the UE by the target MSC in a NAS message to send the information to the UE. For example, the MME may also carry, through a global unique temporary identity reallocation (GUTI reallocation) message of an extended LTE system, the information such as the new TMSI and LAI which are allocated to the UE in the extended GUTI reallocation message to send the information to the UE; or, the MME may also send, to the UE through a newly added message, the information such as the new TMSI and LAI which are allocated to the UE by the target MSC.

The UE may update its currently registered LAI by using the LAI obtained from the MME.

412. The ENB triggers that the UE is connected to the target 2G/3G cell through a NACC procedure or a PS handover procedure.

The ENB may trigger, after determining that the UE has obtained, from the MME, the temporary mobile station identity TMSI and the location area identity LAI which are allocated to the UE by the MSC corresponding to the location area of the target 2G/3G cell, that the UE is connected to the target 2G/3G cell in a NACC manner.

The ENB may send a cell change order (CCO) or a HANDOVER COMMAND to the UE; and after receiving the CCO or HANDOVER COMMAND from the ENB, the UE is connected to the 2G/3G network.

In one application scenario, a manner in which the ENB determines whether the UE has obtained, from the MME, the TMSI and LAI which are allocated to the UE by the MSC corresponding to the location area of the target 2G/3G cell may be:

The MME may notify the access network device (the MSC corresponding to the location area of the target 2G/3G cell)

through a new S1-AP message that allocation of the TMSI and LAI to the UE is completed; or, the MME may add, in a downlink non-access stratum transport (DOWNLINK NAS TRANSPORT) message, one instruction that the allocation of the TMSI and LAI to the UE is completed; the ENB determines, according to the instruction, that the UE has obtained, from the MME, the TMSI and LAI which are allocated to the UE by the MSC corresponding to the location area of the target 2G/3G cell; or, the ENB, upon receiving the DOWNLINK NAS TRANSPORT message, takes by default that the allocation of the TMSI and LAI to the UE by the MSC corresponding to the location area of the target 2G/3G cell is completed.

Of course, the ENB may also determine in other manners that the UE has obtained, from the MME, the TMSI and LAI which are allocated to the UE by the MSC corresponding to the location area of the target 2G/3G cell.

The UE finds, after being connected to the target 2G/3G cell in the NACC manner or the PS handover manner, that the location area stored by it is the same as a current location area of the 2G/3G cell, and may not initiate a location area update process, which may avoid a voice service interruption of the UE.

If the original MSC and the target MSC are different MSCs, an MSC handover is needed, and step 413 is executed; and if the original MSC and the target MSC are the same MSC, step 425 is executed.

413. The target MSC sends a location update message to the HLR.

Step 413 and step 410 are not subject to a definite sequence, and for example, may be executed simultaneously.

414. The HLR sends a location cancel message to the original MSC; and the original MSC stops paging and returns a reply message to the HLR.

415. The HLR inserts subscription data into the target MSC.

416. The original MSC initiates a resume call handling (RCH) notification.

417. The GMSC releases the call of the original MSC.

418. The GMSC reinitiates a send routing information (SRI) request message.

419. The HLR continues completing insertion of the subscription data.

420. The HLR returns a location update message reply to a new MSC.

421. The HLR sends a provide roaming number (PRN) request message to the target MSC to require the target MSC to PRN.

422. The target MSC provides a roaming number.

423. The HLR returns a send routing information request reply message to the GMSC.

424. The GMSC sends an initial address message (IAM) to the target MSC.

425. The UE responds the target MSC with a paging response message, or sends a service request message to set up a NAS connection to the target MSC.

426. Continue completing a CS call process.

It may be seen that in this embodiment, before the ENB triggers that the called UE is connected to the target 2G/3G cell, the location area information of the target 2G/3G cell to which the called UE prepares to connect is notified to the MME, the MME requests the target MSC to perform the location area update on the called UE and feeds back to the called UE the TMSI and LAI which are allocated to the called UE by the target MSC, so that the called UE, after being connected to the target 2G/3G cell subsequently, may not initiate the location area update process, which may reduce a voice delay for the called UE. It may be found that, the solution in this embodiment helps to reduce a delay of a voice service when the UE falls back to a 2G/3G, and can enhance user experience.

Figure 5:
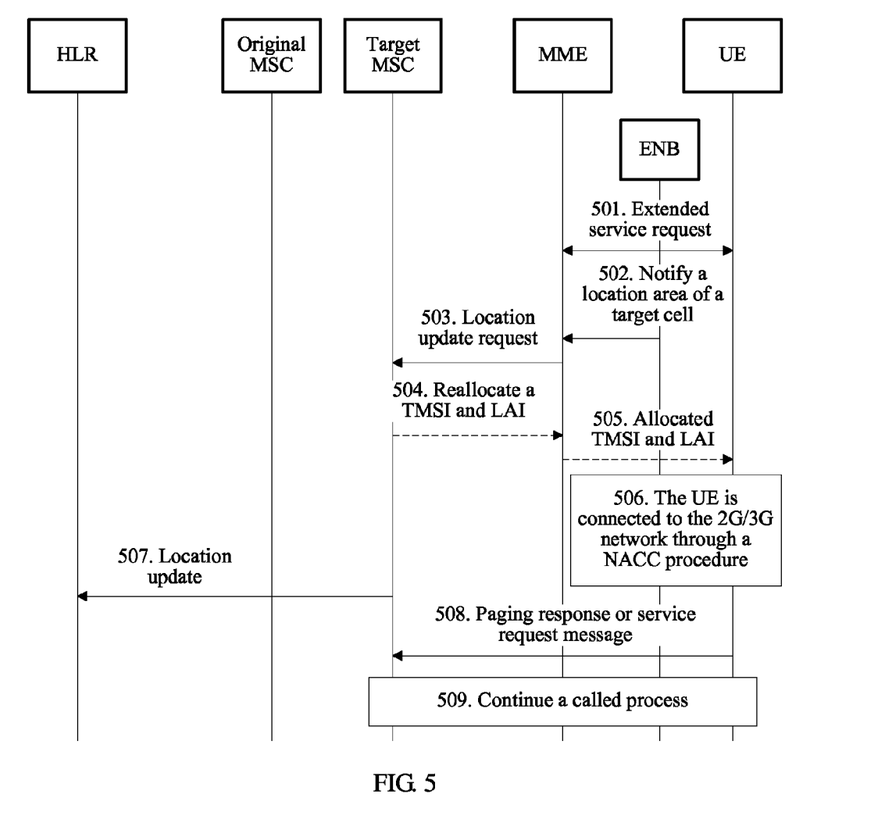
FIG. 5 is a flow chart of another method for falling back to a 2G/3G network according to an embodiment of the present invention.

For ease of better understanding of the solutions in the embodiments of the present invention, a method for falling back to a 2G/3G network according to an embodiment of the present invention is illustrated in the following by taking a procedure that a calling UE is connected to the 2G/3G network as an example. Referring to FIG. 5, the method for falling back to the 2G/3G network according to another embodiment of the present invention may include:

501. A calling UE sends an extended service request message to an MME to initiate a CSFB process.

502. An ENB sends, to the MME, a message carrying location area information of a target 2G/3G cell.

The MME may send a context setup message to the ENB to instruct the ENB that the calling UE requires initiating the CSFB process. At this time, the ENB may send, after learning that the calling UE requires initiating the CSFB process, the MME the message carrying the location area information of the target 2G/3G cell.

Optionally, before the ENB sends a target cell location area notification message to the MME, the ENB may command the calling UE to perform measurement; the calling UE may report a measurement report, which includes measurement information; and the ENB selects the target 2G/3G cell according to the measurement information.

Of course, the ENB may also select the target 2G/3G cell for the UE according to other conditions.

Further, if the MME notifies the ENB of information of a location area where the UE is currently registered (for example, through the context setup message or other messages), the ENB may also determine whether a location area of the UE is going to change first, if determining that the location area of the UE is going to change, further sends the message carrying the location area information of the target 2G/3G cell, and if determining that the location area of the UE is not going to change, does not send, to the MME, the message carrying the location area information of the target 2G/3G cell.

The message carrying the location area information of the target 2G/3G cell sent to the MME by the ENB may be, for example, a newly added message.

503. The MME sends a message for requesting to perform a location update on the UE to the MSC corresponding to a location area of the target 2G/3G cell (target MSC).

The target MSC and an original MSC might be the same MSC, and might also be different MSCs.

In one application scenario, the message for requesting to perform the location update on the UE sent to the target MSC by the MME may be, for example, a location update request message, or other messages that may request the MSC to perform the location update on the UE.

Before sending a second message to the MSC, the MME needs to determine whether the location area of the UE is going to change, for example, the MME may compare the location area of the target 2G/3G cell and the location area where the UE is currently registered to check whether they are the same, if different, determines that the location area of the UE is going to change; and if the same, determines that the location area of the UE is not going to change.

Alternatively, if it is determined by an access network device whether the location area of the UE is going to change, and after it is determined that a location of the UE is changed, the message carrying the location area information of the target 2G/3G cell is further sent to the MME, so that upon receiving the first message from the access network device, the MME determines by default that the location area of the UE is going to change.

If determining that the location area of the UE is going to change, the MME further sends a location area update request message to the MSC.

504. The target MSC allocates a new TMSI and LAI to the UE, and sends, to the MME, a message carrying the new TMSI and LAI which are allocated to the UE by the target MSC.

In one application scenario, if the message for requesting to perform the location update on the UE sent to the target MSC by the MME is a location update request message, the message carrying the new TMSI and LAI which are allocated to the UE by the target MSC, where the message is sent to the MME by the target MSC, may be, for example, a location update response message.

505. The MME sends, to the UE, the message carrying the new TMSI and LAI which are allocated to the UE by the target MSC.

The MME may carry, for example, information such as the new TMSI and LAI which are allocated to the UE by the target MSC, in a NAS message and send the information to the UE. For example, the MME may carry, through a GUTI reallocation message of an extended LTE system, the information such as the new TMSI and LAI which are allocated to the UE, in an extended GUTI reallocation message and send the information to the UE; or, the MME may also send, to the UE through a newly added message, the information such as the new TMSI and LAI which are allocated to the UE by the target MSC.

The UE may update a currently registered LAI by using the LAI obtained from the MME.

506. The ENB triggers that the UE is connected to the target 2G/3G cell through a NACC procedure or a PS handover message.

The ENB may trigger, after determining that the UE has obtained, from the MME, the temporary mobile station identity TMSI and the location area identity LAI which are allocated to the UE by the MSC corresponding to the location area of the target 2G/3G cell, that the UE is connected to the target 2G/3G cell in a NACC manner or through the PS handover message.

The ENB may send, to the UE, a CCO or a HANDOVER COMMAND message; and upon receiving the CCO or HANDOVER COMMAND message from the ENB, the UE is connected to the 2G/3G network.

In one application scenario, a manner in which the ENB determines whether the UE has obtained, from the MME, the TMSI and LAI which are allocated to the UE by the MSC corresponding to the location area of the target 2G/3G cell may be:

The MME may notify the access network device through a new S1-AP message that allocation of the TMSI and LAI to the UE by the MSC corresponding to the location area of the target 2G/3G cell is completed; or, the MME may add, in a downlink non-access stratum transport (DOWNLINK NAS TRANSPORT) message, one instruction that the allocation of the TMSI and LAI to the UE is completed; the ENB determines, according to the instruction, that the UE has obtained, from the MME, the TMSI and LAI which are allocated to the UE by the MSC corresponding to the location area of the target 2G/3G cell; or, the ENB takes, upon receiving the DOWNLINK NAS TRANSPORT message, by default that the allocation of the TMSI and LAI to the UE by the MSC corresponding to the location area of the target 2G/3G cell is completed.

Of course, the ENB may also determine in other manners that the UE has obtained, from the MME, the TMSI and LAI which are allocated to the UE by the MSC corresponding to the location area of the target 2G/3G cell.

After being connected to the target 2G/3G cell, finding that its stored location area is the same as a current location area of the 2G/3G cell, the UE may not initiate a location area update process, and therefore may reduce a delay of a voice service for the UE.

If the original MSC and the target MSC are different MSCs, an MSC handover is needed, and step 507 is executed; and if the original MSC and the target MSC are the same MSC, step 508 is executed.

507. The target MSC sends a location update message to an HLR to perform the location update.

Step 507 and step 504 are not subject to a definite sequence, for example, may be executed simultaneously.

508. The UE responds the target MSC with a paging response message, or sends a service request message to set up a NAS connection to the target MSC.

509. Continue completing a CS call process.

It may be seen that in this embodiment, before the ENB triggers that the calling UE is connected to the target 2G/3G cell, the location area information of the target 2G/3G cell to which the calling UE prepares to connect is notified to the MME, the MME requests the target MSC to perform the location area update on the calling UE and feeds back to the UE the TMSI and LAI which are allocated to the calling UE by the target MSC, so that the calling UE, after being connected to the target 2G/3G cell subsequently, may not initiate the location area update process, which may reduce the delay of the voice service for the calling UE. It may be found that, the solution in this embodiment helps to reduce the delay of the voice service when the UE falls back to the 2G/3G network, and can enhance user experience.

Furthermore, for better implementation of the foregoing technical solutions in the embodiments of the present invention, the embodiments of the present invention further provide a corresponding device.

Figure 6A:
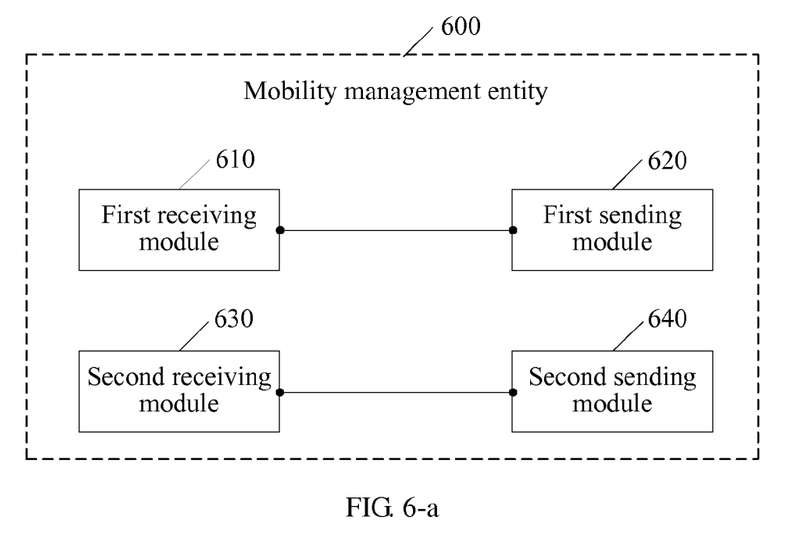

Referring to FIG. 6-*a*, a mobility management entity 600 according to an embodiment of the present invention may include:

A first receiving module 610 is configured to receive a first message from an access network device, where the first message carries location area information of a target 2G/3G cell to which a user equipment UE prepares to connect.

The first message may be, for example, one newly added message for notifying the mobility management entity of the location area information of the target 2G/3G cell to which the UE (a calling UE or a called UE) prepares to connect.

Alternatively, the access network device may also use an existing handover request message (handover required), where the message already carries the location area information of the target 2G/3G cell. Further, the access network device may add, in the handover request message, one field for instructing whether a handover needs to be initiated, and if the field instructs that the handover is not needed, the mobility management entity 600 does not initiate a PS handover process to a 2G/3G. Of course, it may also be determined by the mobility management entity 600 whether to initiate the PS handover. For example, if the target 2G/3G network does not support the PS handover, the mobility management entity 600 does not initiate the PS handover.

A first sending module 620 is configured to send a second message for requesting to perform a location update on the UE to a mobile switching center MSC corresponding to the location area of the target 2G/3G cell.

In one application scenario, the second message sent by the first sending module 620 may be, for example, a location update request message, or other messages that may request the MSC to perform the location update on the UE.

Before the first sending module 620 sends the second message to the MSC, the mobility management entity 600 needs to determine whether a location area of the UE is going to change, and one determining method may be comparing whether the location area of the target 2G/3G cell is the same as the location area where the UE is currently registered, if different, determines that the location area of the UE is going to change; and if the same, determines that the location area of the UE is not going to change.

Alternatively, it may also be determined by the access network device whether the location area of the UE is going to change, if going to change, the access network device then sends the first message to the mobility management entity 600, and the mobility management entity 600 directly determines, upon receiving the first message from the access network device, that the location area of the UE is not going to change, and if determining that the location area of the UE is not going to change, the access network device directly ends a location area update process.

If the mobility management entity 600 determines that the location area of the UE is going to change, the first sending module 620 sends the second message to the MSC.

Further the MSC may receive the second message for requesting to perform the location update on the UE from the mobility management entity 600, and may allocate a new temporary mobile station identity TMSI and location area identity LAI to the UE.

A second receiving module 630 is configured to receive a third message from the MSC, and the third message carries the TMSI and LAI which are allocated to the UE by the MSC.

In one application scenario, the third message may be, for example, a location update response message, or other messages carrying the TMSI and LAI which are allocated to the UE by the MSC.

A second sending module 640 is configured to send, to the UE, a fourth message carrying the TMSI and LAI, so that after being connected to the target 2G/3G cell, the UE communicates with the MSC using the TMSI.

Further, the third message may also carry the LAI allocated to the UE by the MSC, so that the UE stores the LAI, and after being connected to the target 2G/3G cell, if finding by comparison that the stored LAI by it is the same as a LAI corresponding to the target 2G/3G cell, does not initiate the location area update process. It may be understood that, the LAI stored by the UE is the same as the LAI corresponding to the target 2G/3G cell.

Further, the UE may update a currently registered LAI by using the LAI obtained from the mobility management entity 600; and the access network device (ENB) may trigger, after determining that the UE has obtained, from the mobility management entity 600, the temporary mobile station identity TMSI and the location area identity LAI which are allocated to the UE by the MSC corresponding to the location area of the target 2G/3G cell, that the UE is connected to the target 2G/3G cell in a NACC manner or a PS handover manner. After being connected to the target 2G/3G cell, the UE finds that its stored location area is the same as a current location area of the 2G/3G cell, and may not initiate the location area update process, and therefore may reduce a delay of a voice service for the UE.

In addition, the access network device may also directly notify the UE of the LAI corresponding to the target cell, the MSC mainly allocates the TMSI to the UE, and the mobility management entity 600 may send, upon receiving a message carrying the TMSI allocated to the UE by the MSC, the message carrying the TMSI to the UE, and notify the UE of the TMSI allocated to the UE by the MSC.

Figure 6B:
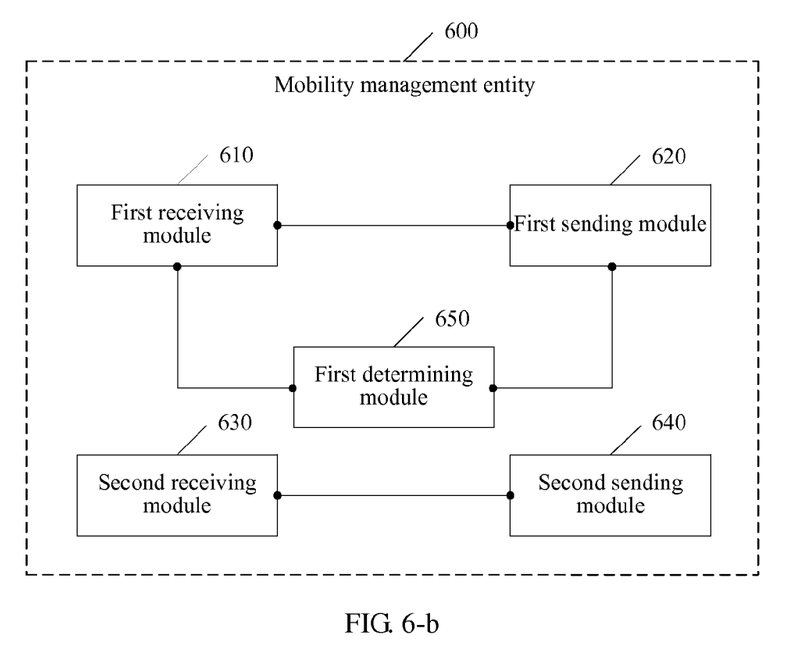

Referring to FIG. 6-b, in one application scenario, the mobility management entity 600 may also include:

A first determining module 650 is configured to compare the location area of the target 2G/3G cell and the location area where the UE is currently registered to check whether they are the same.

Accordingly, the first sending module 620 is specifically configured to send, after the first determining module 650 finds by comparison that the location area of the target 2G/3G cell is different from the location area where the UE is currently registered, the second message for requesting to perform the location update on the UE to an MSC corresponding to the location area of the target 2G/3G cell.

In one application scenario, the second message may be a location update request message; and the third message may be a location update reply message.

It may be understood that, in this embodiment, the mobility management entity 600 may be the MME in the foregoing method embodiments, and it may be use to implement all of the technical solutions in the method embodiments, a function of each functional module may be specifically implemented according to the methods in the foregoing method embodiments, and reference may be made to relevant descriptions in the foregoing embodiments for its specific implementation procedure, which is not repeatedly described here.

Figure 7A:
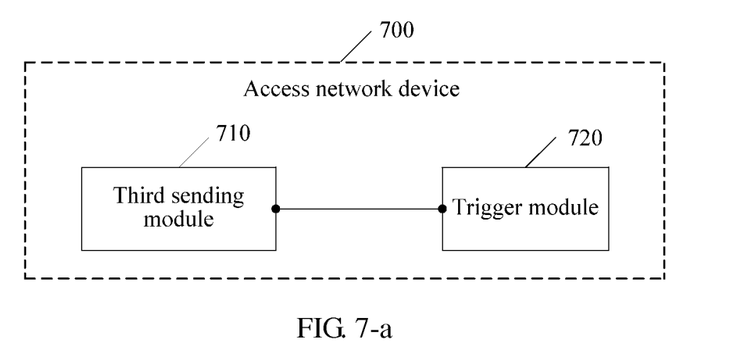

Referring to FIG. 7-a. an access network device 700 according to an embodiment of the present invention may include:

A third sending module 710 is configured to send a first message to a mobility management entity, where the first message carries location area information of a target 2G/3G cell to which a user equipment UE prepares to connect.

The first message may be, for example, one newly added message for notifying the MME of the location area information of the target 2G/3G cell to which the UE (a calling UE or a called UE) prepares to connect. Alternatively, the access network device 700 may also use an existing handover request message (handover required), where the message already carries the location area information of the target 2G/3G cell. Further, the access network device 700 may add, in the handover request message, one field for instructing whether a handover needs to be initiated, and if this field instructs that the handover is not needed, the mobility management entity does not initiate a PS handover process to a 2G/3G. Of course, it may also be determined by the mobility management entity whether to initiate a PS handover. For example, if the target 2G/3G network does not support the PS handover, the mobility management entity does not initiate the PS handover.

Further, before sending the first message to the MME, the access network device 700 may first determine whether a location area of the UE is going to change, and one determining method may be comparing whether the location area of the target 2G/3G cell is the same as a location area where the UE is currently registered, if different, determines that the location area of the UE is going to change; and if the same, determines that the location area of the UE is not going to change.

The access network device 700 further sends, if determining that the location area of the UE is going to change, the first message to the MME; and may directly end, if determining that the location area of the UE is not going to change, the location area update process.

In another application scenario, the access network device 700 may also directly send the first message to the MME, and the MME determines whether the location area of the UE is going to change.

A trigger module 720 is configured to trigger, after determining that the UE had obtained, from the mobility management entity, a temporary mobile station identity TMSI allocated to the UE by the MSC corresponding to the location area of the target 2G/3G cell, that the UE is connected to the target 2G/3G cell.

Further, the UE may also obtain, from the mobility management entity, a LAI allocated to the UE by the MSC.

In one application scenario, a manner in which the trigger module 720 determines whether the UE has obtained, from the MME, the TMSI and LAI which are allocated to the UE by the MSC corresponding to the location area of the target 2G/3G cell may be:

The MME may notify the access network device 700, through a new S1-AP message, that allocation of the TMSI and LAI to the UE by the MSC corresponding to the location area of the target 2G/3G cell is completed; or, the MME may add, in a downlink non-access stratum transport (DOWNLINK NAS TRANSPORT) message, one instruction that the allocation of the TMSI and LAI to the UE is completed; the trigger module 720 determines, according to the instruction, that the UE has already obtained, from the MME, the TMSI and LAI which are allocated to the UE by the MSC corresponding to the location area of the target 2G/3G cell; or, the trigger module 720 takes, upon receiving the DOWNLINK NAS TRANSPORT message, by default that the allocation of the TMSI and LAI to the UE by the MSC corresponding to the location area of the target 2G/3G cell is completed.

Of course, the trigger module 720 may also determine in other manners that the UE has obtained, from the MME, the TMSI and LAI which are allocated to the UE by the MSC corresponding to the location area of the target 2G/3G cell.

In addition, the access network device 700 may also directly notify the UE of a LAI corresponding to the target cell, the MSC mainly allocates the TMSI to the UE, and the MME may send, upon receiving a message carrying the TMSI allocated to the UE by the MSC, a message carrying the TMSI to the UE, and notify the UE of the TMSI allocated to the UE by the MSC.

Figure 7B:
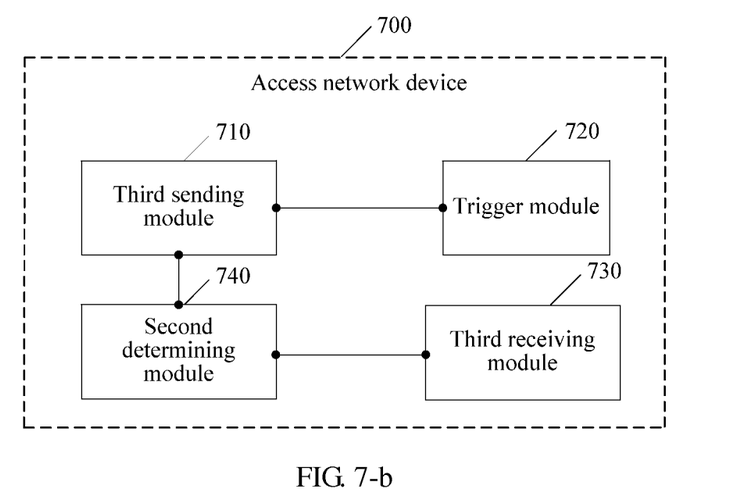

Referring to FIG. 7-b, in one application scenario, the access network device 700 may also include:

A third receiving module 730 is configured to receive a message which carries information of the location area where the UE is currently registered and is sent by a mobility management entity.

A second determining module 740 is configured to determine, according to the message of the information of the location area where the UE is currently registered, whether the location area of the UE is going to change.

Accordingly, the third sending module 710 is specifically configured to send, after the second determining module 740 determines that the location area of the UE is going to change, the first message to the MME.

Further, an embodiment of the present invention further provides a communication system, which may include: a mobility management entity 600, or an access network device 700.

Figure 8:
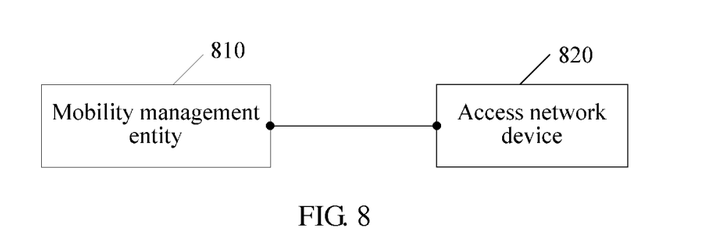
FIG. 8 is a schematic diagram of a communication system according to an embodiment of the present invention.

Referring to FIG. 8, an embodiment of the present invention further provides a communication system, including: a mobility management entity 810 and an access network device 820.

The mobility management entity 810 is configured to receive a first message from the access network device 820, where the first message carries location area information of a target 2G/3G cell to which a user equipment UE prepares to connect; send, when determining that a location area of the UE is going to change, a second message for requesting to perform a location update on the UE to an MSC corresponding to a location area of the target 2G/3G cell; receive a third message from the MSC, where the third message carries a temporary mobile station identity TMSI and a location area identity LAI which are allocated to the UE by the MSC; and send a fourth message carrying the TMSI and the LAI to the UE.

The access network device 820 is configured to send the first message to the mobility management entity 810, where the first message carries the location area information of the target 2G/3G cell to which the user equipment UE prepares to connect; and trigger, after determining that the UE has obtained, from the mobility management entity 810, the temporary mobile station identity TMSI and the location area identity LAI which are allocated to the UE by the MSC corresponding to the location area of the target 2G/3G cell, that the UE is connected to the target 2G/3G cell.

In one application scenario, the second message may be a location update request message; and the third message may be a location update reply message.

Figure 9:
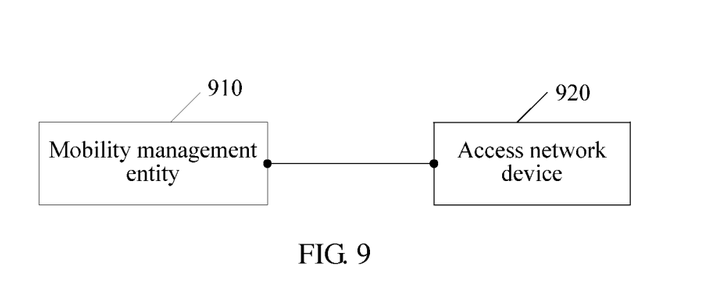
FIG. 9 is a schematic diagram of another communication system according to an embodiment of the present invention.

Referring to FIG. 9, an embodiment of the present invention further provides a communication system, including: a mobility management entity 910 and an access network device 920.

The mobility management entity 910 is configured to receive a first message from the access network device 920, where the first message carries location area information of a target 2G/3G cell to which a user equipment UE prepares to connect; send a second message for requesting to perform a location update on the UE to an MSC corresponding to a location area of the target 2G/3G cell; receive a third message from the MSC, where the third message carries a temporary mobile station identity TMSI and a location area identity LAI which are allocated to the UE by the MSC; and send a fourth message carrying the TMSI and the LAI to the UE.

The access network device 920 is configured to send, when determining that a location area of the UE is going to change, the first message to the mobility management entity 910, where the first message carries the location area information of the target 2G/3G cell to which the user equipment UE prepares to connect; and trigger, after determining that the UE has obtained, from the mobility management entity 910, the temporary mobile station identity TMSI and the location area identity LAI which are allocated to the UE by the MSC corresponding to the location area of the target 2G/3G cell, that the UE is connected to the target 2G/3G cell.

In one application scenario, the second message may be a location update request message; and the third message may be a location update reply message.

In conclusion, according to the embodiments of the present invention, before the access network device triggers that the UE is connected to the target 2G/3G cell, the location area information of the target 2G/3G cell to which the UE prepares to connect is first notified to the MME, the MME requests the MSC corresponding to the location area of the target 2G/3G cell to perform the location area update on the UE, and feeds back the TMSI allocated to the UE by the MSC to the UE, so that after being connected to the target 2G/3G cell subsequently, the UE may directly use the TMSI to communicate with the MSC and perform a corresponding service, and does not needs to obtain the TMSI by initiating the location area update process after being connected to the target 2G/3G cell, which may reduce the delay of the voice service. It may be found that, the solution in the embodiment helps to reduce the delay of the voice service after a calling (or called) UE is connected to the 2G/3G network, which may enhance the user experience.

Persons of ordinary skill in the art may understand that all or part of the processes of the method according to the foregoing embodiments may be implemented by a program instructing relevant hardware. The program may be stored in a computer readable storage medium. When the program is executed, the processes of the foregoing method according to the embodiments are included. The storage medium may be a read-only memory (ROM), a random access memory (RAM), a magnetic disk, a compact disk, and the like.

The method for falling back to the 2G/3G network, the relevant device and the communication system which are provided by the embodiments of the present invention are introduced in detail in the foregoing. The principle and implementation manners of the present invention are elaborated by using specific examples. The descriptions of the foregoing embodiments are merely used for ease of understanding of the method and a core idea of the present invention. Meanwhile, persons of ordinary skill in the art may make variations to the present invention in terms of a specific implementation manner and an application scope according to the idea of the present invention. In conclusion, the content of the specification shall not be understood as limitation to the present invention.

What is claimed is:

1. A method for initiating a fallback to a 2G/3G network, the method comprising:
   receiving, by an access network device, an instruction that a user equipment (UE) requires initiating a circuit switching fallback (CSFB) process, the instruction is comprised in a context setup message and sent by a mobility management entity (MME); and
   selecting, by the access network device, a target 2G/3G cell according to a measurement report reported by the UE; and
   sending, from the access network device to the MME, a message carrying location area information of the target 2G/3G cell according to the instruction, wherein the message carrying the location area information of the target 2G/3G cell comprises a handover request message.

2. The method according to claim 1, further comprising:
   receiving, by the access network device, information of a location area where the UE is currently registered, the information is comprised in the context setup message and sent by the MME.

3. The method according to claim 1, wherein the access network device is an eNodeB of an evolved universal mobile telecommunications system terrestrial radio access network (E-UTRAN).

4. An access network device, comprising:
   a receiving unit, configured to receive an instruction that a user equipment (UE) requires initiating a circuit switching fallback (CSFB) process, the instruction is comprised in a context setup message and sent by a mobility management entity (MME); and
   a selecting unit, configured to select a target 2G/3G cell according to a measurement report reported by the UE; and
   a sending unit, configured to send, the MME a message carrying location area information of the target 2G/3G cell to the MME, the location area information being based on the instruction, wherein the message carrying the location area information of the target 2G/3G cell comprises a handover request message.

5. The access network device according to claim 4, the receiving unit, further configured to:
   receive information of a location area where the UE is currently registered, the information is comprised in the context setup message and sent by the MME.

6. The access network device according to claim 4, the access network device is an eNodeB of an evolved universal mobile telecommunications system terrestrial radio access network (E-UTRAN).

7. A method for initiating a fallback to a 2G/3G network, the method comprising:
   sending, by a mobility management entity (MME) to an access network device, an instruction that the UE requires initiating a circuit switching fallback (CSFB) process, the instruction is comprised in a context setup message; and
   receiving, by the MME, a message carrying location area information of a target 2G/3G cell, where the message is sent by the access network device, wherein the message carrying the location area information of the target 2G/3G cell comprises a handover request message, wherein the target 2G/3G cell is selected by the access network device according to a measurement report reported by the UE.

8. The method according to claim 7, further comprising:
   sending, by the MME to the access network device, information of a location area where the UE is currently registered, the information is comprised in the context setup message.

* * * * *